(12) United States Patent
Czuchry, Sr. et al.

(10) Patent No.: US 6,741,244 B1
(45) Date of Patent: May 25, 2004

(54) IMAGE IMPROVEMENT APPARATUS AND METHOD

(75) Inventors: Andrew J. Czuchry, Sr., Gray, TN (US); Andrew J. Czuchry, Jr., Auburn, GA (US)

(73) Assignee: Microporous Products, L.P., Piney Flats, TN (US)

( * ) Notice: Subject to any disclaimer, the term of this patent is extended or adjusted under 35 U.S.C. 154(b) by 44 days.

(21) Appl. No.: 10/193,425

(22) Filed: Jul. 11, 2002

(51) Int. Cl.$^7$ ............................................. G06T 15/00
(52) U.S. Cl. ...................... 345/419; 345/441
(58) Field of Search ................. 345/419, 441

(56) References Cited

U.S. PATENT DOCUMENTS

| | | | |
|---|---|---|---|
| 1,128,979 A | 2/1915 | Hess | |
| 1,918,705 A | 7/1933 | Ives | |
| 5,099,320 A | 3/1992 | Allio | |
| 5,828,380 A | * 10/1998 | Lin | ............... 345/441 |
| 6,064,424 A | 5/2000 | van Berkel et al. | |
| 6,069,650 A | 5/2000 | Battersby | |
| 6,118,584 A | 9/2000 | van Berkel et al. | |
| 6,373,963 B1 | 4/2002 | Demers et al. | |
| 6,373,970 B1 | 4/2002 | Dong et al. | |

FOREIGN PATENT DOCUMENTS

WO    WO 02/17646 A1    2/2002

OTHER PUBLICATIONS

Philips Research, Technical Information on 3D–LCD, Copyright 2002.

* cited by examiner

*Primary Examiner*—Mark Zimmerman
*Assistant Examiner*—Lance W. Sealey
(74) *Attorney, Agent, or Firm*—Luedeka, Neely & Graham PC

(57) ABSTRACT

A method and apparatus for converting a digital image of one or more objects to interpolated three-dimensional image data for producing substantially realistic three-dimensional images. The method includes providing a digital image file containing digital image pixels, wherein the pixels having a structural contour relationship to the one or more objects. The digital image pixels are converted to contour corrected pixels to provide a contoured image file. An output image file is built from the contoured image file so that the output image file may be projected on an image output device. The method and apparatus provide substantially improved three-dimensional images for viewing on a variety of image output devices.

15 Claims, 4 Drawing Sheets

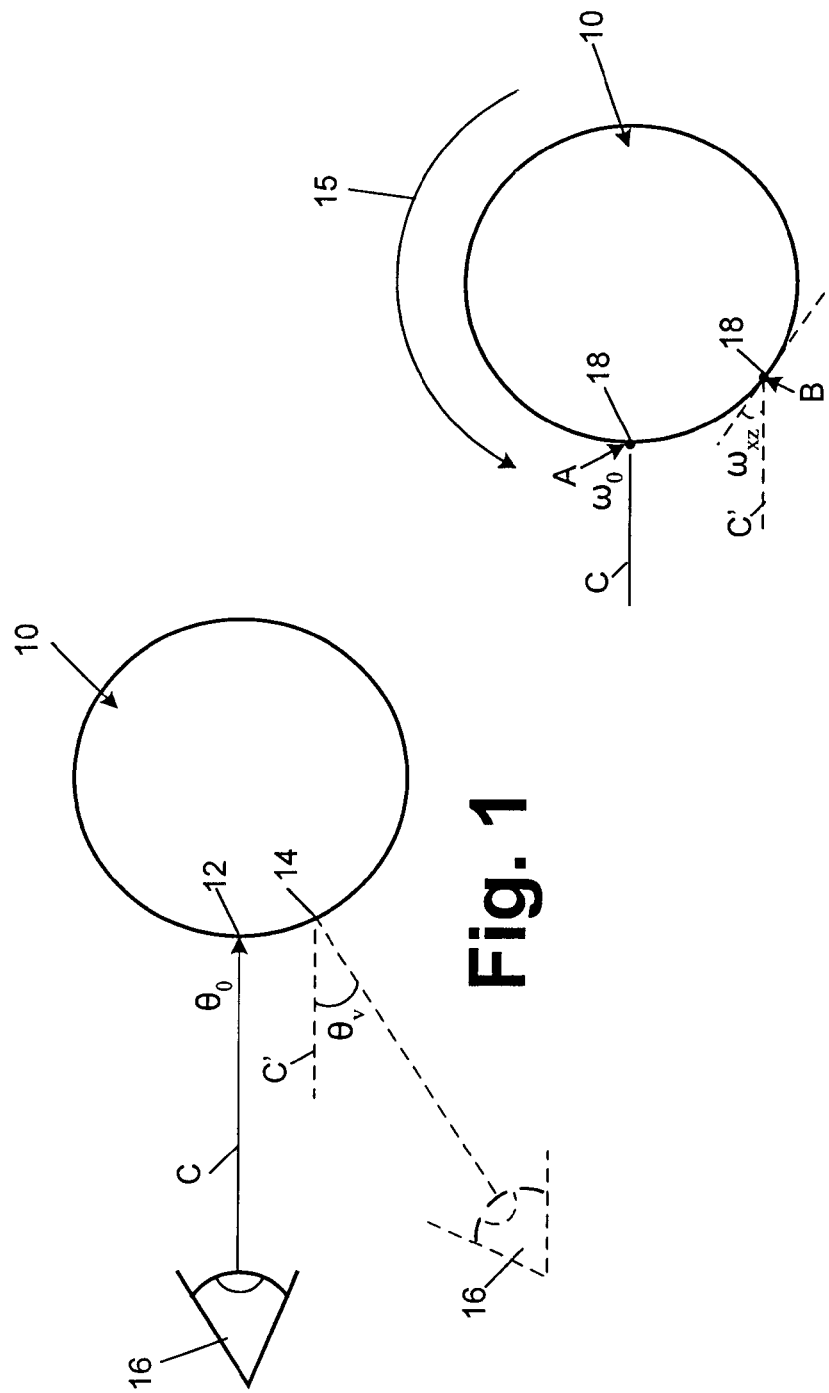

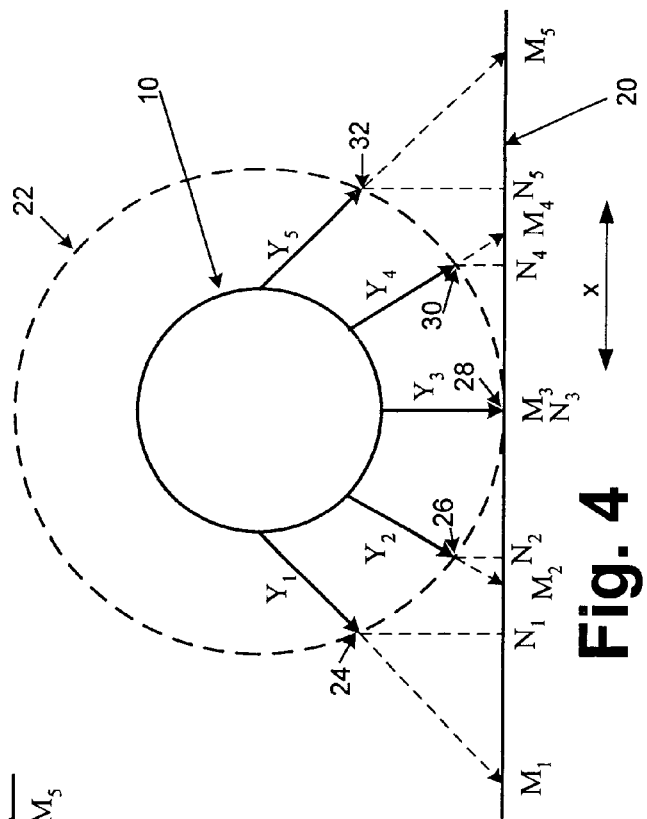
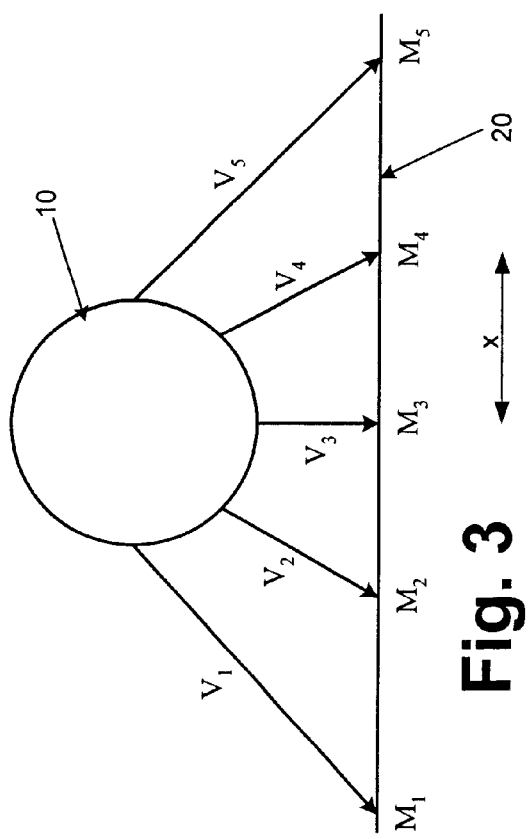
Fig. 3
Prior Art
Fig. 4

IMAGE IMPROVEMENT APPARATUS AND METHOD

FIELD OF THE INVENTION

The invention relates to apparatus for forming and viewing improved three-dimensional images of objects.

BACKGROUND

Image processing is applicable to a wide variety of applications including entertainment, medical, scientific investigations, and the like. One problem with such image processing is that it often fails to provide realistic three-dimensional images using inexpensive imaging devices such as cathode ray tubes (CRT's), liquid crystal displays (LCD's), lenticular devices, and laser or ink jet printers. In conventional image processing techniques, redundant image information is combined to provide a simulated three-dimensional image suitable for display by a two-dimensional display device. The appearance of depth in such images is provided by combining multiple segments of planar image data. The actual contour of the image is often ignored or severely distorted. Accordingly, the further the segment of image data is from the ideal focal point, the less sharp the image. Many conventional three-dimensional imaging techniques are thus based on combining two or more offset planar images to provide a simulation of depth as perceived by the human eye.

There continues to be a need for a method and apparatus for providing realistic three-dimensional images without the need for elaborate or costly imaging devices. There is also a need for an image processing technique which more closely approximates image perception experienced by the human eye without the need for multiple image input devices.

SUMMARY OF THE INVENTION

In one embodiment, with regard to the foregoing and other needs, the invention provides a method for converting a digital image of one or more objects to interpolated three-dimensional image data for producing a substantially realistic three-dimensional image of the object or objects. The method includes providing a digital image file containing digital image pixels, wherein the pixels have a structural contour relationship to the one or more objects. The digital image pixels are converted to contour corrected pixels to provide a contoured image file. An output image file is built from the contoured image file so that the output image file may be projected on an image output device.

In another embodiment, the invention provides an improved imaging tool. The imaging tool includes:
  an image file input device for receiving one or more image data files;
  a conversion module for converting the one or more image data files to pixelated data having color, depth and positional parameters;
  a positional translation module for incrementally adjusting the pixelated data to provide incremental positional data;
  an image correction module for receiving the color, depth, positional parameters, and incremental positional data for the pixelated data and providing corrected pixels having updated depth and updated position; and
  an output image correlation module for providing corrected pixels to an image output device.

Advantages of the invention include the ability to provide more realistic three-dimensional images of one or more objects on a variety of output devices. The images may be corrected for any desired image resolution. The imaging tool enables closer correlation between the contours of the image and the pixel positions of the image on the output device. For example, conventional three-dimensional imaging techniques provide redundant overlapping planar images to give the perception of depth. However, planar images do not include sufficient contour parameters to provide realistic depth perception of the images. The present invention solves the problem by providing pixel by pixel correction based on pixel position and depth or distance from an ideal focal point to provide image interpolation while substantially decreasing redundant image data points. The method and apparatus of the invention is readily adaptable to a variety of image file formats and can be applied to produce more realistic three-dimensional images from three-dimensional or two-dimensional image data.

BRIEF DESCRIPTION OF THE DRAWINGS

Further advantages of the invention will become apparent by reference to the detailed description when considered in conjunction with the figures, wherein like reference numbers indicate like elements throughout, and wherein:

FIG. 1 is a schematic illustration of how an eye of a person views points on one or more objects;

FIG. 2 is a schematic illustration of how the invention provides pixels in a data file for one or more objects;

FIG. 3 is a schematic illustration of the projection of image data for one or more three-dimensional objects on a planar surface;

FIG. 4 is a schematic illustration of an ideal location of image data for one or more three-dimensional objects with respect to a planar surface provided by the invention;

DETAILED DESCRIPTION OF THE INVENTION

Figure 5:
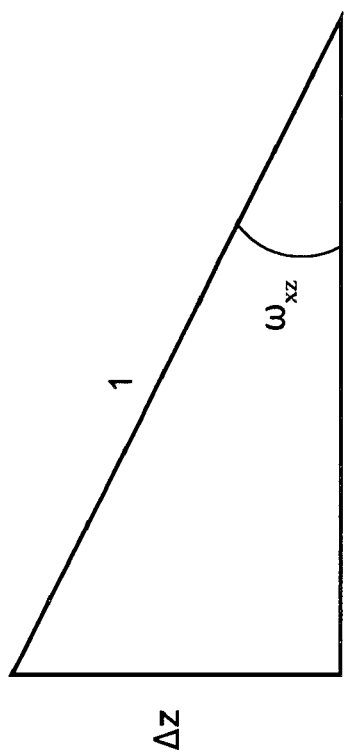
FIG. 5 is a schematic illustration of a relationship between changes in x and z coordinates of a pixel and angular movement of the pixel of one or more objects as the one or more objects are rotated.

The invention provides a manner for simulating how an eye views one or more objects. For the purposes of simplicity, the aspects of the invention will be described with respect to the image of a single object. However, the invention is adaptable to an image or images of multiple objects. In one aspect, simulation is accomplished by combining pixel data from an object in a unique manner. For example, with reference to FIGS. 1 and 2, points 12 and 14 on an object represented by circle 10, may be viewed by an eye 16 of a person starting from an initial position having an initial view angle ($\theta_0$), of zero degrees with respect to reference line C. As the eye 16 of a person moves around the object 10 in a counter-clockwise manner to view point 14, the view angle ($\theta_v$) changes and becomes greater than zero as illustrated by the dotted lines in FIG. 1.

In order to simulate how an eye views an object 10, the invention provides a manner for placing pixels for the object 10 in a data file so as to build an image for the object 10 which simulates how the eye 16 would view such object in a three-dimensional world. According to the invention, as the object 10 is rotated counter-clockwise, as shown by arrow 15, point 18 representing a pixel moves from position A to position B. The change in angle with respect to reference line C is referred to as the angular velocity ($\omega_{xz}$) of the point 18. Angular velocity is used to represent the angle because the rate at which the angle changes as the object is rotated is related to the positioning of the pixel relative to an actual point 18 on the object 10. For highly curved or contoured objects, the rate of change of the angle is greater than for less curved or contoured objects. In order to provide pixel data point placement in a data file so that the reproduced image more closely simulates an actual three-dimensional image, the relationship between the view angle ($\theta_v$) and the angular velocity ($\omega_{xz}$) is provided as described in more detail below.

The differences between conventional imaging techniques and the imaging techniques of the invention using the relationship between the view angle ($\theta_v$) and the angular velocity ($\omega_{xz}$) are described now, in conjunction with FIGS. 3–6. Using conventional imaging techniques, image data for an object 10 (FIG. 3) are projected by vectors $V_1$, $V_2$, $V_3$, $V_4$, and $V_5$ to a relatively planar or two-dimensional plane 20. For simplification, only projection of image data in the x direction on plane 20 is illustrated, however, it is understood that the image data has both x and y components for projection on plane 20. The length of the vectors $V_1$, $V_2$, $V_3$, $V_4$, and $V_5$ is equal to the distances the image data representing the object are from the plane 20. As shown in FIG. 3, these distances vary for each data point such that ($V_1$ and $V_5$)≠($V_2$ and $V_4$)≠($V_3$). Hence, the positioning of data points on plane 20 in the x direction, represented by $M_1$, $M_2$, $M_3$, $M_4$, and $M_5$, respectively, is offset from an ideal position as discussed with reference to FIG. 4, thus introducing error into the image data.

Another way of looking at the data for an image is that vector $V_3$ represents projection of image data to a focal point $M_3$. Ideally, all of the image data is projected to corresponding points $M_1$, $M_2$, $M_4$, and $M_5$ with the same size vectors as vector $V_3$. However, in order for the data points to be visible, they must intersect plane 20. For this to occur, the vectors for the image data $V_1$, $V_2$, $V_4$, and $V_5$ do not have the same length as vector $V_3$. Hence, the data points $M_1$, $M_2$, $M_4$, and $M_5$ are not in focus when the image file is reproduced in visible form.

The invention provides a unique way to correct the image data so that all of the data points for the image will be substantially more in focus as compared to image data obtained using prior art techniques thereby improving image resolution. With reference to FIG. 4, the ideal positions for pixels for an image is along an arcuate path 22 corresponding to the contours of an object providing pixel data 24, 26, 28, 30, and 32. However, in order to view the image, the pixel data are projected to a two-dimensional plane 20 such as paper or a video screen as described above. In contrast to conventional techniques, pixel data 24, 26, 28, 30, and 32 lying on the arcuate path 22 are projected to the plane 20 to provide new data points N1, N2, N3, N4, and N5, along the x direction of the two-dimension plane 20. In this case, vectors Y1, Y2, Y3, Y4, and Y5, representing the distance of the pixel data 24, 26, 28, 30, and 32 from object 10 along an arcuate path 22 have substantially equal lengths. This results in the projected data points for the pixel data being substantially more in focus than if the pixel data was projected to data points M1, M2, M4, and M5.

Because the pixel placement provided by the invention is with respect to an arcuate path 22, the ideal position for each pixel point placement is shifted by an angle $\omega_{xz}$ which represents movement of a pixel point along the arcuate path 22 as the object is rotated as described above with reference to FIG. 2. The magnitude of the shift in the placement of the projected data point lying on the arcuate path 22 is represented by $\Delta x$ (FIG. 5). The distance the pixel points on the arcuate path 22 are from the two-dimensional plane 20 is represented by the term $\Delta z$ in FIG. 5. Accordingly, as the object 10 is rotated so that a pixel moves from pixel point 28 to pixel point 30 along the arcuate path 22, the projected pixel data placement on the two-dimensional plane 20 moves from data point $N_3$ to data point $N_4$ as shown in FIG. 4. The $\Delta x$ and $\Delta z$ dimensions for pixel placement are calculated from the angular velocity ($\omega_{xz}$) by the following equations:

$$\cos(\omega_x) = \Delta x/1 = \Delta x \qquad (I)$$

$$\sin(\omega_z) = \Delta z/1 = \Delta z \qquad (II)$$

Figure 6:
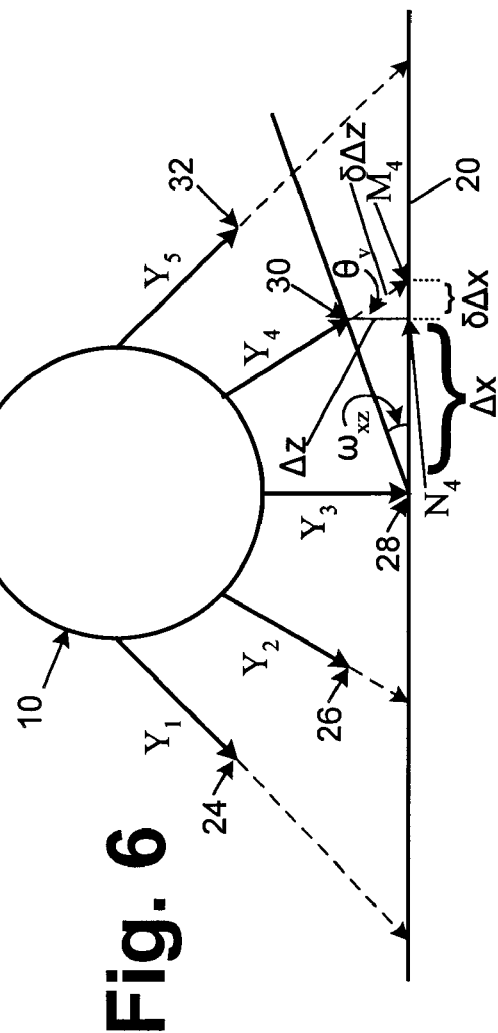
FIG. 6 is a schematic illustration of a method for calculating ideal image data locations for one or more three-dimensional objects to provide a perception of depth on a two dimensional image device.

The relationship between the angular velocity ($\omega_{xz}$) and the view angle $\theta_v$ may be determined by reference to FIGS. 4 and 6. The difference between placement positions $N_4$ and $M_4$ for pixel point 30 projected to plane 20 is defined as $\delta\Delta x$ and represents an error in pixel positioning in the x direction using a traditional planar approach as compared to pixel placement provided by the invention.

With reference to FIGS. 3, 4, and 6, the difference between the length of vectors $V_4$ and $Y_4$ is $\delta\Delta z$. $\delta\Delta z$ represents an error in pixel positioning in the z direction. Referring to FIGS. 1 and 6, the view angle $\theta_v$ can be used to determine the magnitude of the error $\delta\Delta z$ between placement of a pixel point on the two-dimensional plane 20 using conventional techniques and placement of a pixel point on the arcuate path 22. The error $\delta\Delta_z$ and the error $\delta\Delta_x$ are related to the view angle $\theta_v$ according to the following equation, $$\sin(\theta_v) = \delta\Delta x/(\delta\Delta z). \qquad (III)$$

for each view angle used. For each incremental view angle ($\Delta\theta_v$) selected, the relative view angle ($\theta_v$) is provided by the following equation:

$$\theta_v = n*\Delta\theta_v \qquad (IV)$$

wherein n is the number of incremental view angles comprising the total view angle ($\theta_v$).

By using data points 24, 26, 28, 30, and 32 on arcuate path 22, each of the vectors $Y_1 \ldots Y_n$ have the same length. Hence, the errors $\delta\Delta x$ and $\delta\Delta z$ may be calculated from the formulas:

$$\delta\Delta x = \cos(\omega_{xz})*Y_n \text{ and} \qquad (V)$$

$$\delta\Delta z = \sin(\omega_{xz})*Y_n. \qquad (VI)$$

The foregoing relationships are used by the apparatus of the invention to build one or more objects from image data for the one or more objects. Accordingly, pixel data for the object or objects are modified for placement in a data file as described in more detail below. Each of the pixels P for the image have coordinates (i,j). The x and z positions for each pixel $P_{ij}$ of the image generated by the invention are provided by the following equations:

$$x_v = i + \cos(n*\omega_{xij})*d_{ij} \text{ and} \qquad (VII)$$

$$z_v = j + \sin(n*\omega_{zij})*d_{ij}, \qquad (VIII)$$

wherein $x_v$ and $z_v$ are the x and z positions on the arcuate path 22 for pixels $P_{ij}$, n is number of incremental view angles selected, $\omega_{xij}$ and $\omega_{zij}$ are angular velocities for each pixel $P_{ij}$ as the object is rotated, and $d_{ij}$ is a depth shift factor in the z direction for each pixel relative to arcuate path 22 and plane 20.

Starting at a view angle of zero degrees and rotating the object relative to an initial starting position to simulate changes in the view angle as described with reference to FIGS. 1 and 2 above, the x and z coordinates are given by the following equations:

$$x_v = x_0 + \cos(\omega_{x\theta v}) * d_{ij} \text{ and} \quad (IX)$$

$$z_v = z_0 + \sin(\omega_{z\theta v}) * d_{ij} \quad (X)$$

The $\Delta x$ and $\Delta z$ values are calculated by the following equations:

$$\Delta x_v = x_0 + \cos(\omega_{x\Delta\theta v}) * d_{ij} \text{ and} \quad (XI)$$

$$\Delta z_v = z_0 + \sin(\omega_{z\Delta\theta v}) * d_{ij}, \quad (XII)$$

wherein $x_0$ and $z_0$ are the coordinates for pixels lying on planar surface 20 at a relative view angle of zero degrees ($\theta_v = 0$). In the general case, the x and z coordinates for all pixels is given by the following equations:

$$x_v = i + \cos(n * \omega_{xij}) * d_{ij} \text{ and} \quad (XIII)$$

$$z_v = j + \sin(n * \omega_{zij}) * d_{ij}, \quad (XIV)$$

wherein $\omega_{xij}$ and $\omega_{zij}$ are the angles for pixel placement on plane 20 using the ideal positions of the pixels on arcuate path 22.

Hence, the invention tends to capture the smooth flow of image pixels projected from arcuate path 22 to plane 20. Accuracy of placement of the pixels on plane 20 can be improved by selecting smaller and smaller view angles $\theta_v$ or an increased number of incremental view angles up to a practical limit of view angles. However, the processing time for pixel positioning is increased as the view angle size is decreased or number of incremental view angles is increased.

By using the above techniques, the invention provides a method and apparatus for manipulating image data from an image file to provide ideal locations for the pixel data on a two-dimensional viewing surface. Such pixel data are observed to be more in focus and thereby provide more realistic three-dimensional images. This improvement is believed to result primarily from a reduction of errors in pixel placement in the x and z directions.

Figure 7:
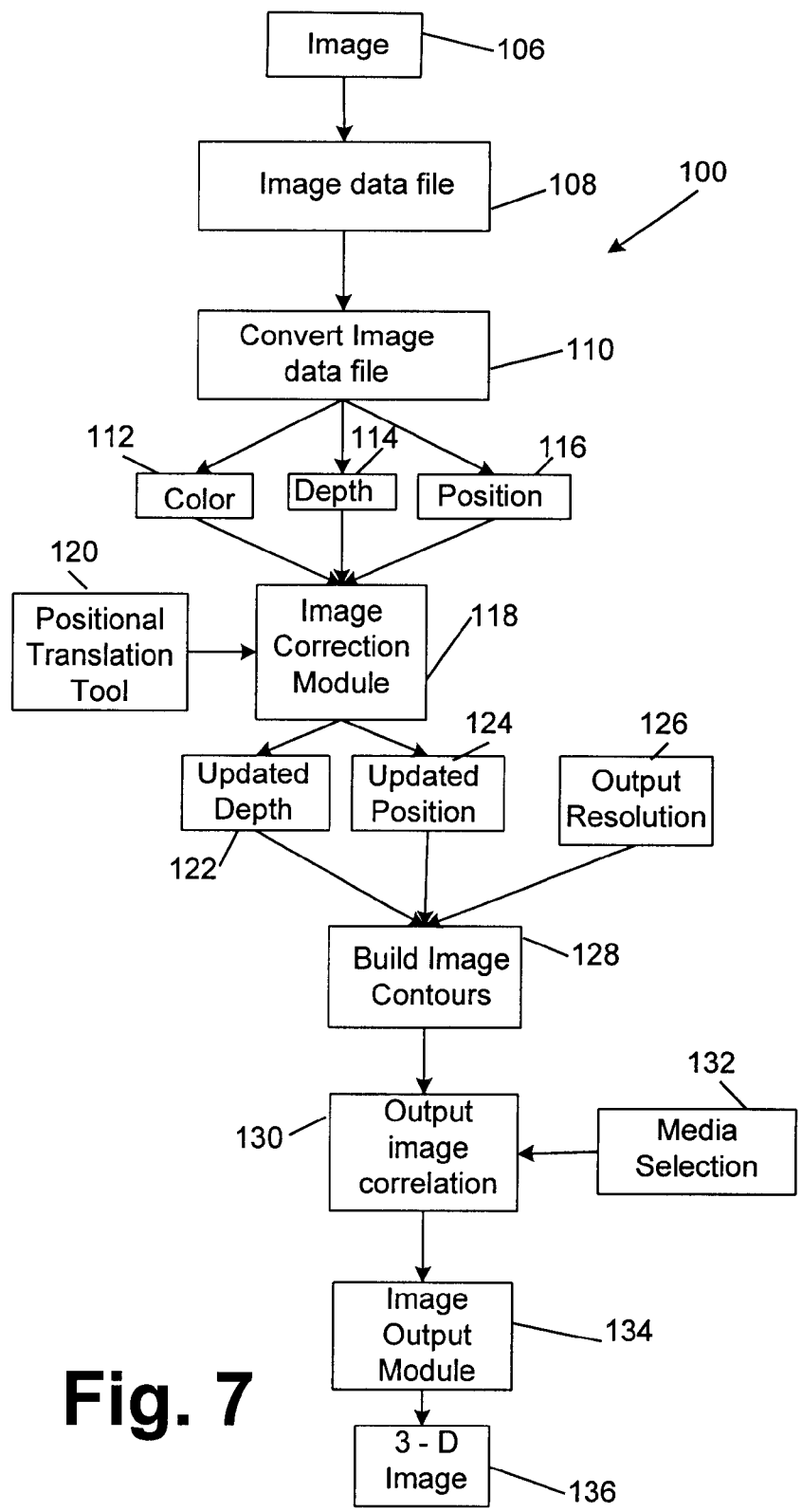
FIG. 7 is a block flow diagram of a method for converting image data to realistic three-dimensional image data.

Since the functions used by the invention are regular functions, i.e., (cos) and (sin), the $\Delta x$ and $\Delta z$ values do not have to have discrete values to provide pixel positioning data. Furthermore, the calculations can generally be performed on any pixel data provided in a wide variety of file formats to provide improved output resolution. A process 100 for application of the invention to an image data file to provide an improved three-dimensional image is provided in FIG. 7.

Referring to the process 100, an image 106 of one or more objects is captured and converted to an image data file 108. Images may be captured by cameras or other input devices which provide image data in a wide variety of image data formats. The image 106 may be a two-dimensional or a three-dimensional image. For a two-dimensional image, additional depth simulation data may be manually inserted into the image data file 108 or interpolated from a series of image data files. Because the image data may be provided in a variety of file formats, the image data file 108 is input to an image conversion tool 110 which converts the image data file 108 into a useable format for the invention. Image formats which are compatible with the system 100 include, but are not limited to jpeg, tiff, bmp, pcx, png, and the like. The image conversion tool 110 provides parameters for each pixel of data. The parameters provided by tool 110 include color 112, depth/distance 114 from the object to a focal plane, and pixel position 1 16 relative to the object and to other pixels representing the object.

The color 112, depth/distance 114 and position 116 data is then input to an image correction module 118. The depth 114 and/or position 116 data input to the image correction module 118 are modified in the image correction module 118 based on the output from positional translation tool 120. Positional translation tool 120 calculates the pixel positions using the above equations I to XIV, particularly equation IV to determining the number of incremental view angles for the object or objects in the image. Next, equations XI and XII are used by positional translation tool 120 to provide $\Delta x$ and $\Delta z$, respectively for each pixel Image correction module 118 integrates the positional translation data calculated by positional translation tool 120 to provide pixel position adjustments for each pixel in the image. More particularly, the pixel position adjustments calculated by equations XI and XII are used in equations XIII and XIV by module 118 to provide the x and z coordinates for each pixel in the pixel data file for the image. The output from the image correction module. 118 includes updated depth 122 and updated position 124 parameters for each pixel.

The updated depth 122 and updated position 124 parameters and a desired output resolution 126 are then input into a image contour building tool 128 which actually builds image contours based on the updated image data provided by correction module 118. Tool 128 combines the color component of each pixel to provide image contours by mapping the updated depth 122 and updated position 124 with the desired output resolution 126 for each given depth. The mapping is conducted pixel by pixel, i.e., the color is assigned for each output pixel's $\Delta x$ and $\Delta z$ adjustment. Higher desired output resolution 126 provides for finer levels of visual distinction for each $\Delta x$ and $\Delta z$ adjustment, whereas, lower resolution output 126 results in visually combining $\Delta x$ and $\Delta z$ adjustments to provide effectively the same pixel positions. Hence, the image contours achieved by tool 128 provide pixel by pixel placement for the improved three-dimensional image based on the resolution 126 desired using the placement of pixel data along arcuate path 22, as set forth above.

After the image is built up, pixel by pixel, an image correlation module 130 correlates the improved image to a particular media. The correlation of the improved image is media dependent and thus the output from module 130 is highly dependant on the media selection 132 which is input to the module. The invention may be applied to a wide variety of media, hence, the media may be selected from planar print media, lenticular viewing systems, electronic media, and the like. Likewise, the image output module 134 provides an image 136 which is highly dependent on the media selected for the image.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for converting a digital image of one or more objects to interpolated thee-dimensional image data for producing substantially realistic three-dimensional image of the object or objects, comprising the steps of:

provide a digital image file containing digital image pixels, the pixels having a structural contour relationship to the one or more objects;

converting the digital image pixels to contour corrected pixels relative to view angles external to the one or more objects to provide a contoured image file;

building an output image file from the contoured image file; and projecting the output image file on an image output device.

2. The method of claim 1 wherein the digital image file comprises pixels having color, depth and positional components.

3. The method of claim 1 wherein the contour corrected pixels comprise color, corrected depth, and pixel path components.

4. The method of claim 3 wherein the output image comprises pixels having x and z coordinates, further comprising providing the x and z coordinates of the pixels in the output image as a function of the corrected depth and pixel path components.

5. The method of claim 1 further comprising selecting an image resolution for the output image file as an input parameter for the step of building the output image file.

6. An imaging tool comprising:

an image file input device for receiving one or more image data files;

a conversion module for converting the one or more image data files to pixelated data having color, depth and positional parameters;

a positional translation module for incrementally adjusting the pixelated data to provide incremental positional data;

an image correction module for receiving color, depth, positional parameters, and incremental positional data for the pixelated data and providing corrected pixels having updated depth and updated position information; and an output image correlation module for providing corrected pixels to an image output device.

7. The imaging tool of claim 6 wherein the image input device is adapted to receive multiple image data file types.

8. The imaging tool of claim 6 wherein the image correction module comprises a depth conversion module for providing updated depth and updated positional parameters for the pixelated data.

9. The imaging tool of claim 8 wherein the image correction module further comprises a density filter module for building the output image from the corrected pixels having updated depth and updated position.

10. The imaging tool of claim 6 wherein the output image correlation module comprises an image projection module for building an output image suitable for the image output device.

11. The imaging tool of claim 6 further comprising an output image file module for converting the output image to a master image file.

12. A machine-readable software program containing the imaging tool of claim 11.

13. A machine-readable software program containing the imaging tool of claim 6.

14. A computer system comprising the machine-readable software program of claim 13.

15. A computer system comprising the imaging tool of claim 6.

* * * * *